United States Patent [19]
Winthrop

[11] Patent Number: 5,726,734
[45] Date of Patent: Mar. 10, 1998

[54] HARD/SOFT SUPERPOSITION PROGRESSIVE LENS DESIGN

[75] Inventor: John T. Winthrop, Stevensville, Mont.

[73] Assignee: American Optical Corporation, Southbridge, Mass.

[21] Appl. No.: 588,977

[22] Filed: Jan. 19, 1996

[51] Int. Cl.[6] .................................................. G02C 7/06
[52] U.S. Cl. ............................................................ 351/169
[58] Field of Search ................................ 351/168, 169, 351/170, 171, 172

[56] References Cited

U.S. PATENT DOCUMENTS

| 4,056,311 | 11/1977 | Winthrop | 351/169 |
| 4,861,153 | 8/1989 | Winthrop | 351/169 |
| 5,123,725 | 6/1992 | Winthrop | 351/169 |
| 5,285,222 | 2/1994 | Waido | 351/169 |

FOREIGN PATENT DOCUMENTS

| 0 295 849 | 12/1988 | European Pat. Off. . |
| 0 654 692 A1 | 5/1995 | European Pat. Off. . |
| 0 668 524 A2 | 8/1995 | European Pat. Off. . |

*Primary Examiner*—Scott J. Sugarman
*Attorney, Agent, or Firm*—Fishman, Dionne, Cantor & Colburn

[57] ABSTRACT

A progressive ophthalmic lens is presented which is a linear composite of a hard lens design and a soft lens design resulting in a composite lens which combines features of the visual utility of a hard lens design with the visual comfort of a soft lens design.

6 Claims, 16 Drawing Sheets

HARD/SOFT SUPERPOSITION PROGRESSIVE LENS DESIGN

BACKGROUND OF THE INVENTION

This invention relates to progressive ophthalmic lenses. More particularly, this invention relates to a new and improved progressive lens design having desirable features of both hard and soft progressive lens designs.

It is commonplace in the field of progressive lenses to refer to hard and soft progressive lens designs. The hard design, reminiscent of the common trifocal, features a spherical distance portion (DP) spanning the width of the lens and a large spherical reading portion (RP), the two zones being connected by an umbilic corridor of progressive dioptric power. The inherent and unavoidable aberrations, i.e., astigmatism, of the hard design are concentrated in the peripheral zones bordering the corridor and spherical RP. Because the aberrations are concentrated in relatively small areas of the lens, their magnitude and rate of variation are highly noticeable to the wearer, giving rise to the term "hard" progressive. In the hard design, maximum distance and reading utility are obtained at the expense of overall visual comfort resulting from concentration of all of the astigmatism in the peripheral zones bordering the umbilic corridor and the spherical reading portion. A typical prior art hard lens design is shown in U.S. Pat. No. 4,056,311, the entire contents of which are incorporated herein by reference.

The soft design lessens the visual impact of the inherent aberrations by allowing them to extend into the lateral areas of the DP and by reducing or minimizing the width of the RP. The soft design may be entirely aspherical in both the distance and reading portions. The magnitude and rate of change of the aberrations of such a design are markedly lower than those of the hard design, giving rise to the term "soft" progressive. In the soft design, enhanced visual comfort is obtained at the expense of reduced acuity in the peripheral areas of the DP and RP. Perhaps the ultimate soft design is disclosed in applicant's prior U.S. Pat. No. 4,861,153, the entire contents of which are incorporated herein by reference.

SUMMARY OF THE INVENTION

Based on the foregoing, it can be seen that the design of progressive lenses can be considered one of trade-off and compromise. For maximum distance and reading utility the hard design is indicated, whereas for maximum comfort one chooses a soft design. From a mathematical perspective, the hard and soft designs represent the endpoints of a continuous spectrum of possible designs distinguished from each other by differing degrees of hardness. A design of intermediate hardness might be obtained, for example, merely by selecting a spherical DP whose size is intermediate between those of the pure hard and pure soft designs. The algebraic description of a typical surface of addition value A (i.e., the power add of the lens) in the design continuum can be written in the functional form $$Z^{(A)} = f^{(A)}(x,y,p) \quad (1)$$

where Z denotes the sag (elevation) of the progressive surface above the x—y plane at the point (x,y) and p stands for a continuously variable parameter or set of parameters (DP and RP size, for example) whose value controls the degree of hardness. Let $p_H$ and $p_s$ denote the parameter sets corresponding to the pure hard and pure soft (endpoint) designs. The functional forms of these two limiting cases are then given by $$Z_H^{(A)} = f^{(A)}(x,y,p_H) \quad (2)$$

and $$Z_X^{(A)} = f^{(A)}(x,y,p_s) \quad (3)$$

respectively.

With such an intermediate design, one might hope to capture some of the advantages of both the hard and soft designs while reducing their disadvantages. However, this is a relatively simplistic approach, and it does not achieve the benefits that can be achieved by the present invention.

In accordance with the present invention, a new design is disclosed for a composite lens in which aspects of hard and soft lens designs are combined in linear superposition to form the composite lens.

DESCRIPTION OF THE PREFERRED EMBODIMENT

In accordance with the present invention, composite progressive lenses are produced having an intermediate degree of hardness. The design of the present invention results in a composite lens having the functional advantages of the pure hard design but exhibiting reduced peripheral aberration (astigmatism). Rather than selecting an intermediate design from the continuum of designs represented by Equation (1), the present invention achieves a composite design, comprised of a linear superposition of the hard and soft endpoint designs represented by Equations (2) and (3). The elevation $Z_C^{(A)}$, of the composite lens above the x,y plane is given by $$Z_C^{(A)} = Z_H^{(A-B)} + Z_X^{(B)} - Z_H^{(0)} \quad (4)$$

In the composite, the hard component has addition A—B and the soft component has addition B, the combination of which yields a composite design of addition A. To avoid a doubling of the composite elevation due to the base curves of the hard and soft components, one of the base curves, here represented by a hard design of zero add, is subtracted from the linear superposition.

The present invention also makes use of a threshold effect, which is that the eye will not notice aberrations (astigmatism) below a certain level, especially if the aberrations are peripherally located. Accordingly, in carrying out the present invention there may be assigned to the soft component the highest addition value possible consistent with unnoticability of the associated peripheral DP aberrations. For most wearers, the DP aberrations associated with a soft design of addition of B<1.25 D will be virtually unnoticeable.

The following examples set forth practical examples of lenses constructed in accordance with the present invention.

EXAMPLE 1

Figure 1:
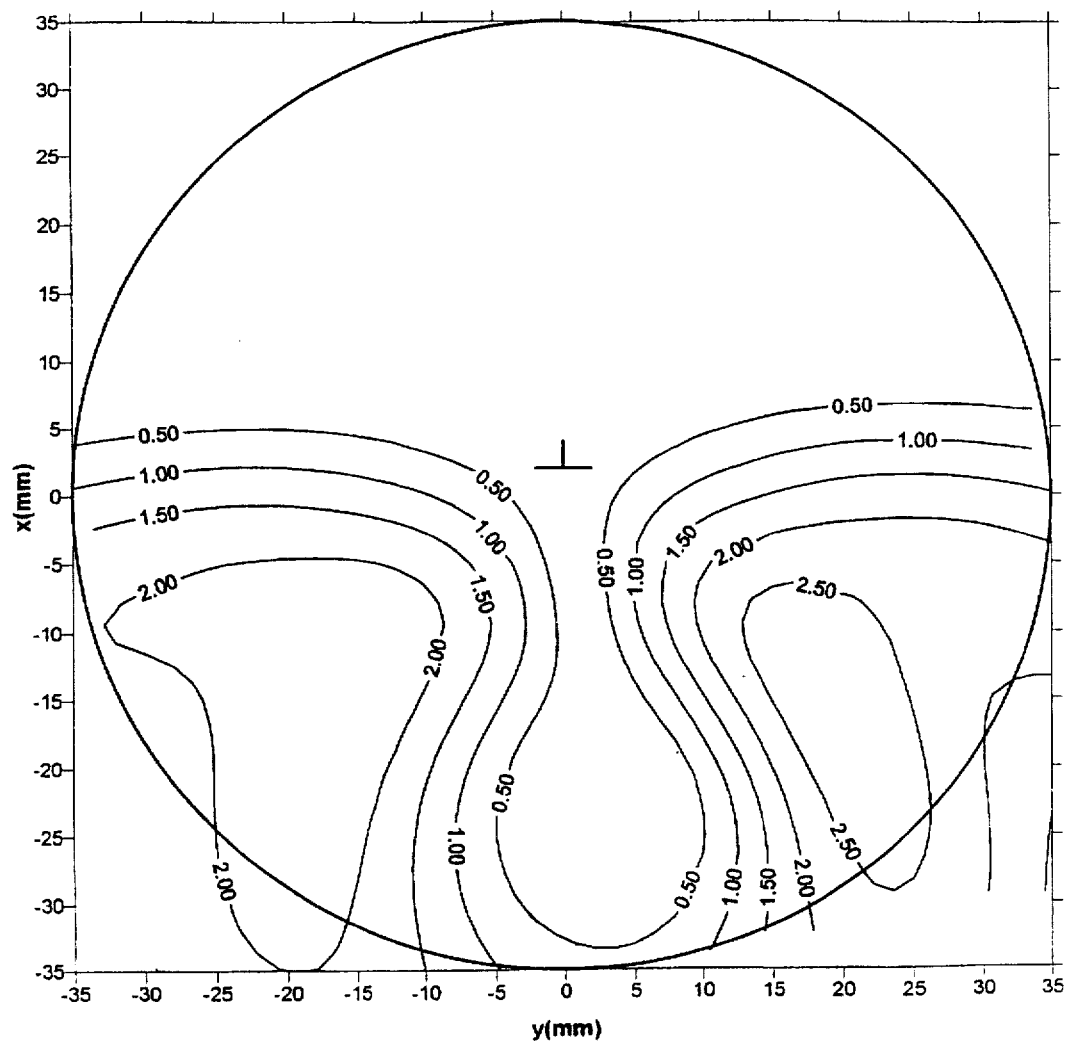
FIGS. 1 and 2 show, respectively, the surface astigmatism and mean power plots for a prior art hard lens design having a 2.0 D add.
Figure 2:
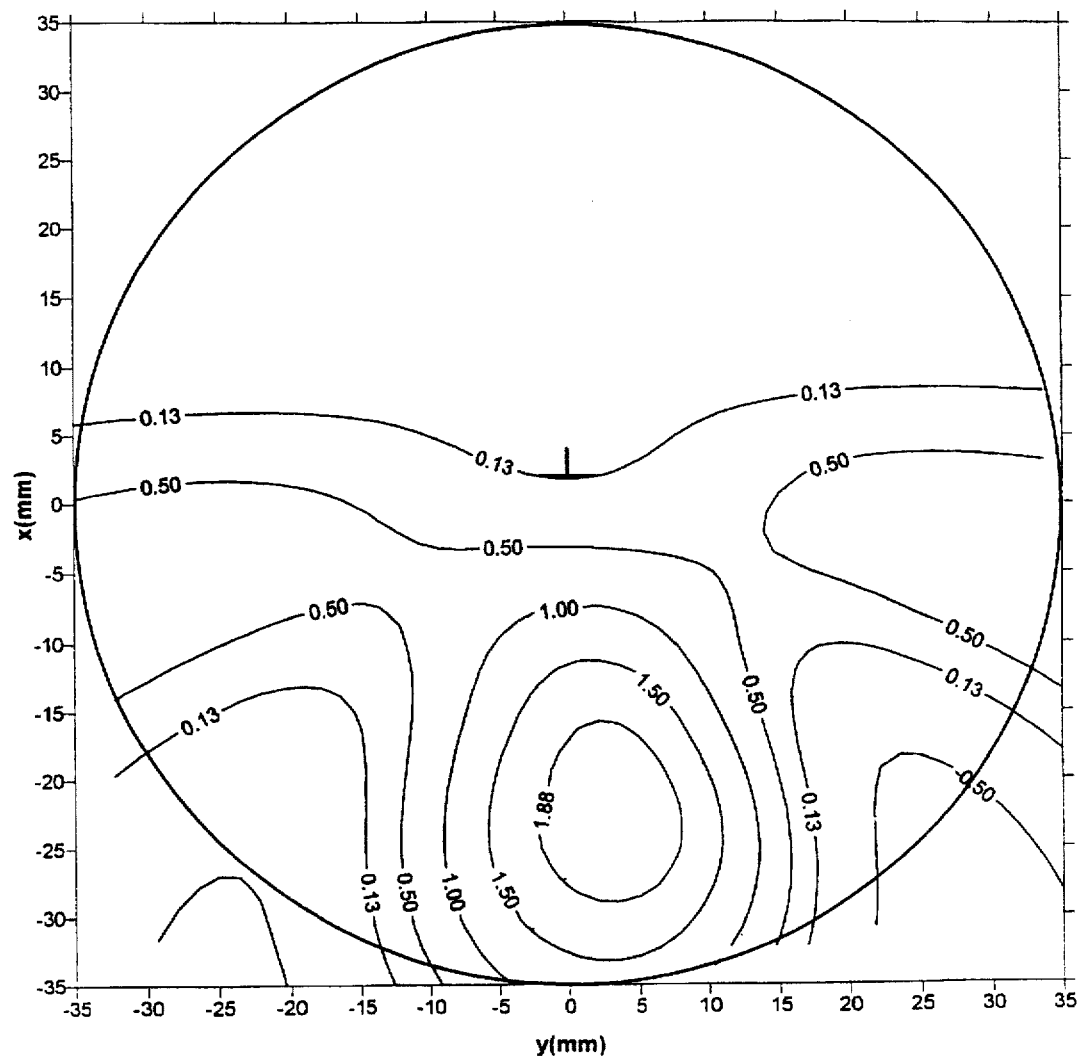
Figure 3:
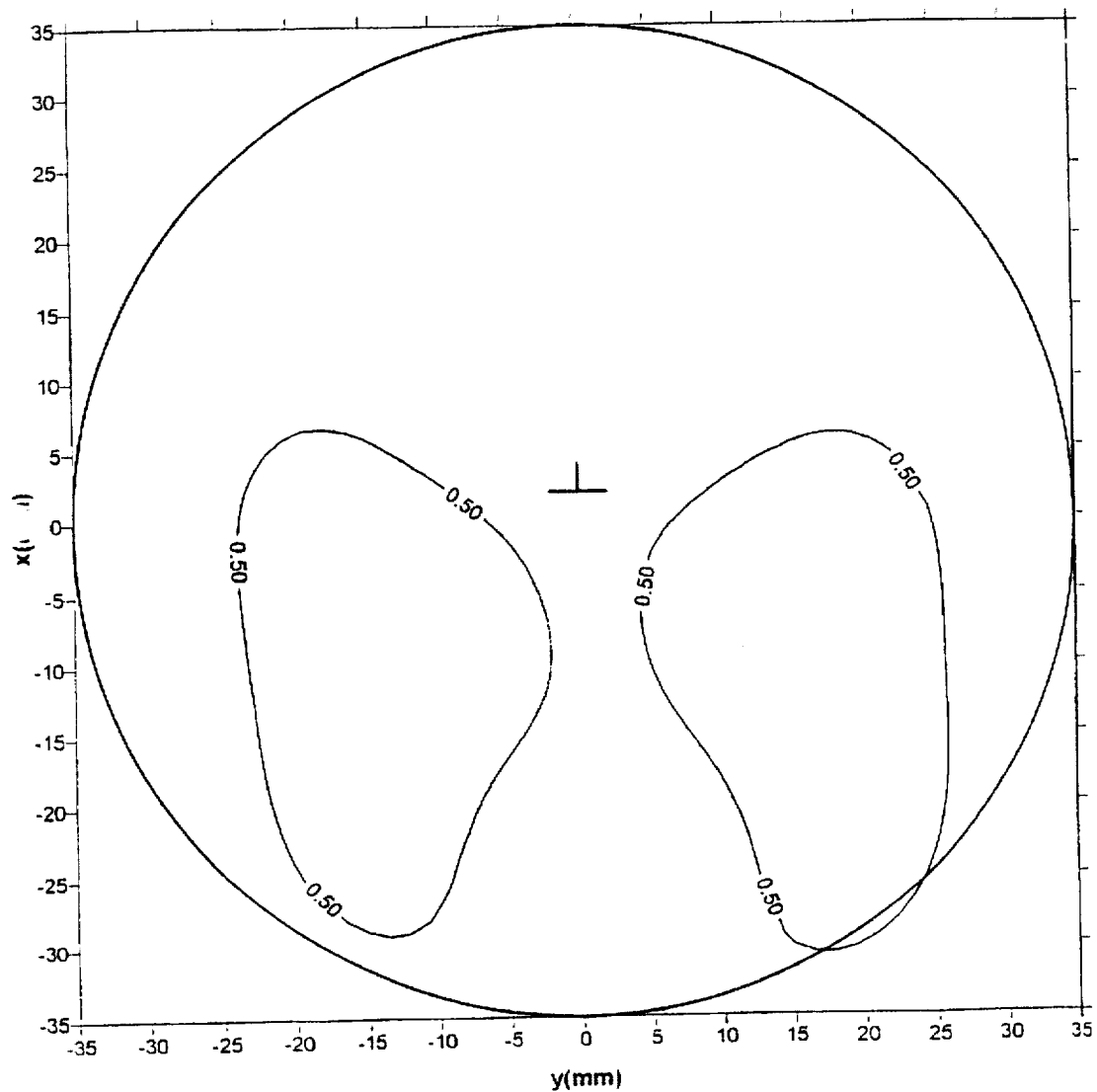
FIGS. 3 and 4 show, respectively, the surface astigmatism and mean power plots for a prior art soft lens design having a 1.25 D add.
Figure 4:
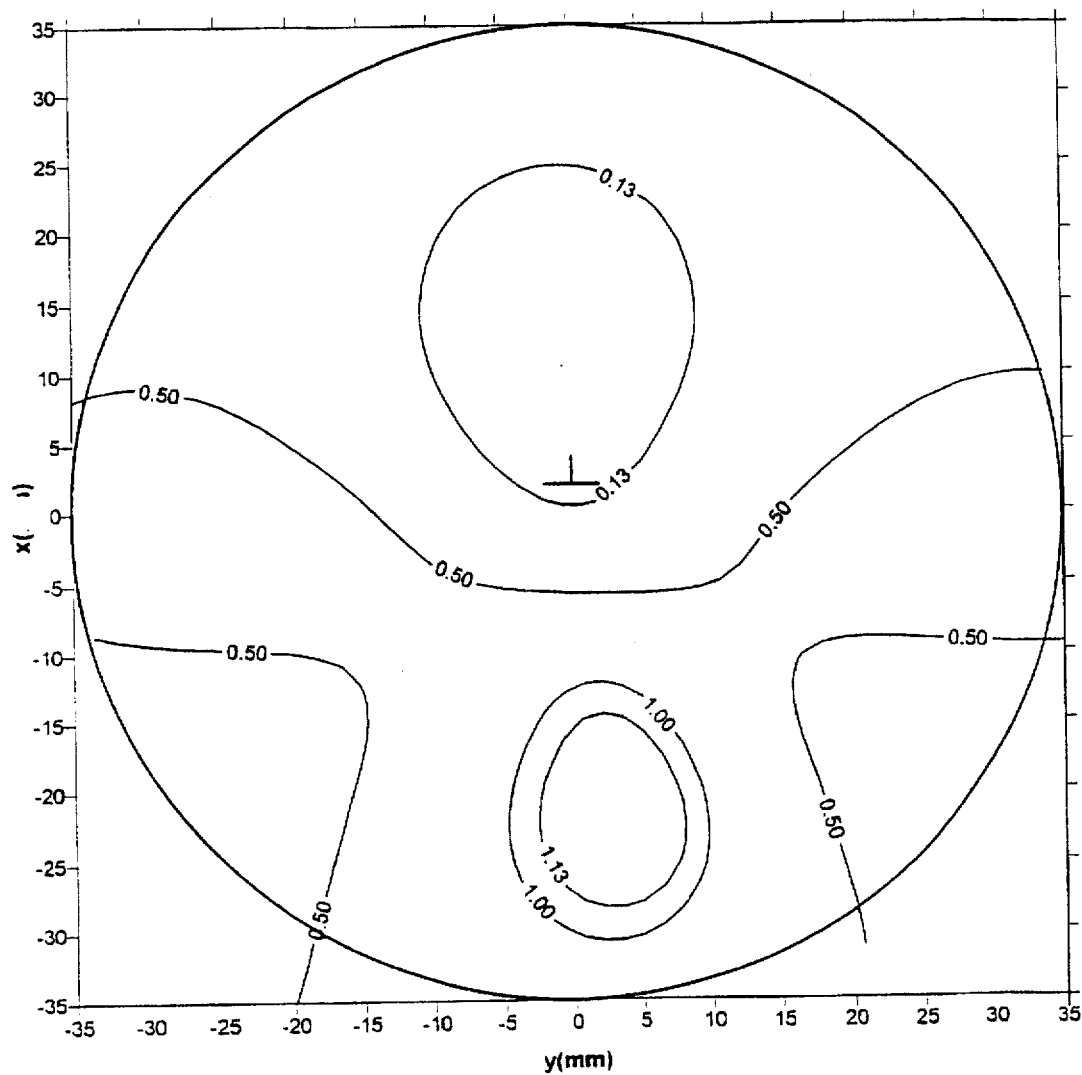
Figure 5:
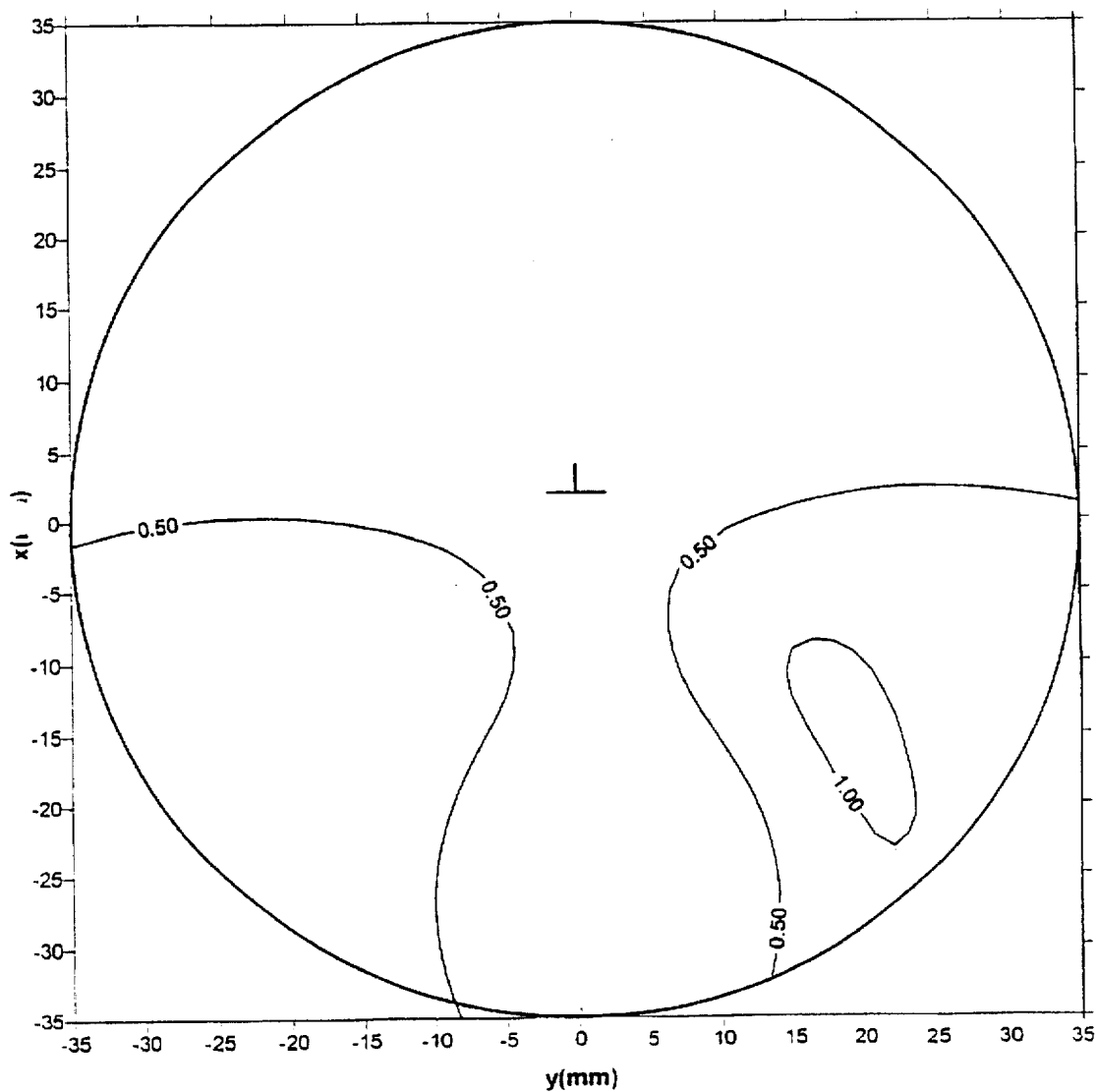
FIGS. 5 and 6 show, respectively, the surface astigmatism and mean power plots for a prior art hard lens design having a 0.75 D add.
Figure 6:
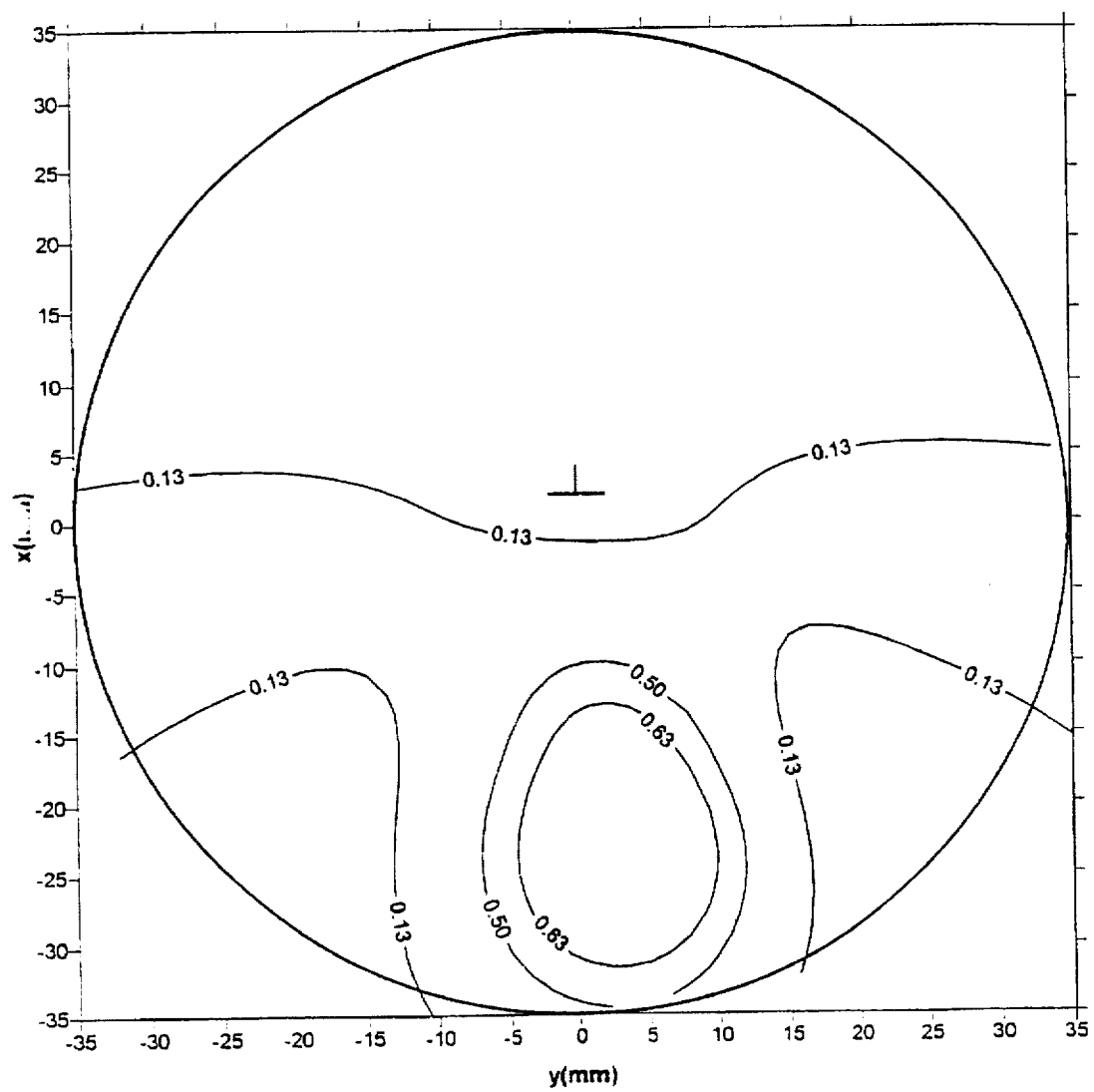
Figure 7:
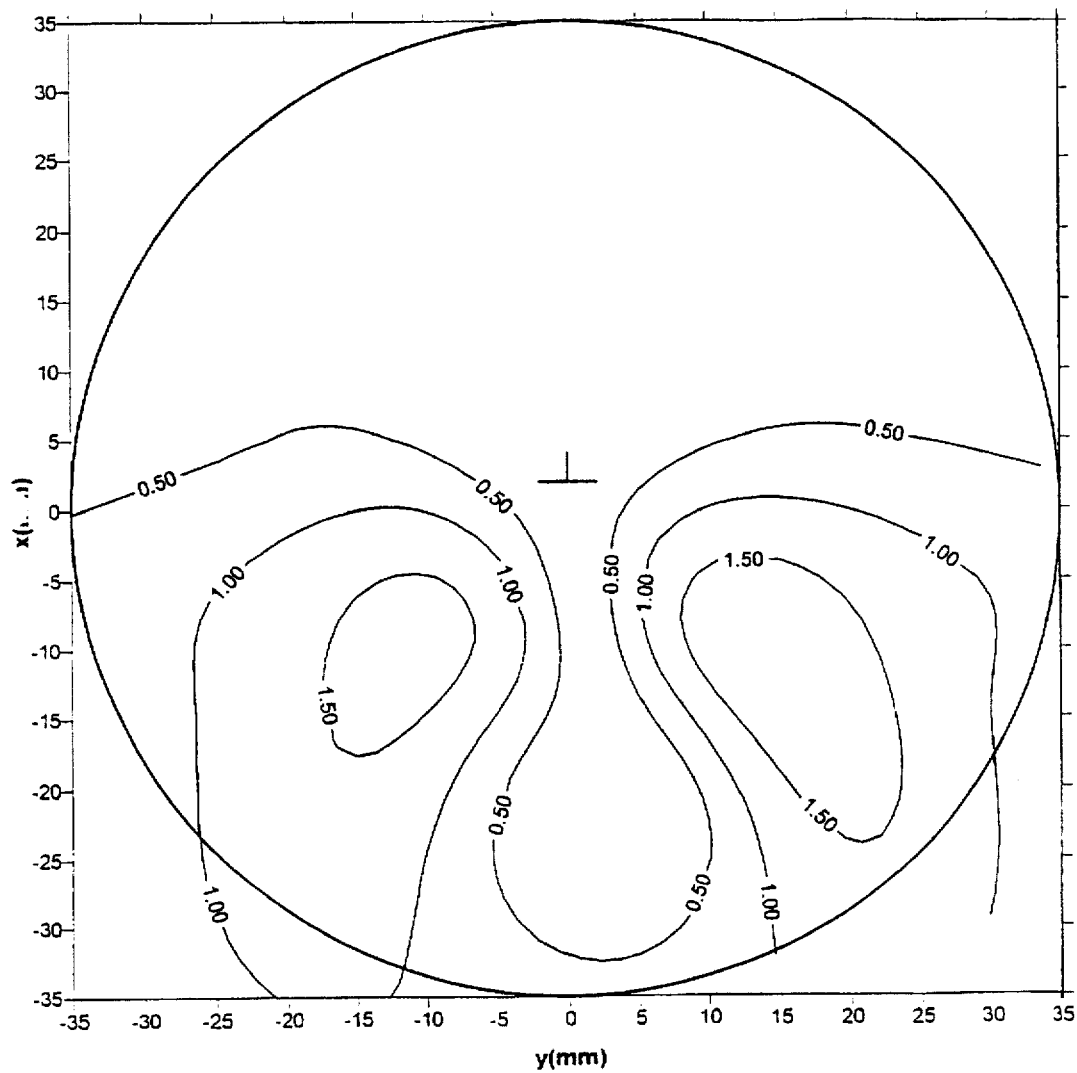
FIGS. 7 and 8 show, respectively, the theoretical surface astigmatism and power plots for a composite lens of this invention having an overall add of 2.0 D.
Figure 8:
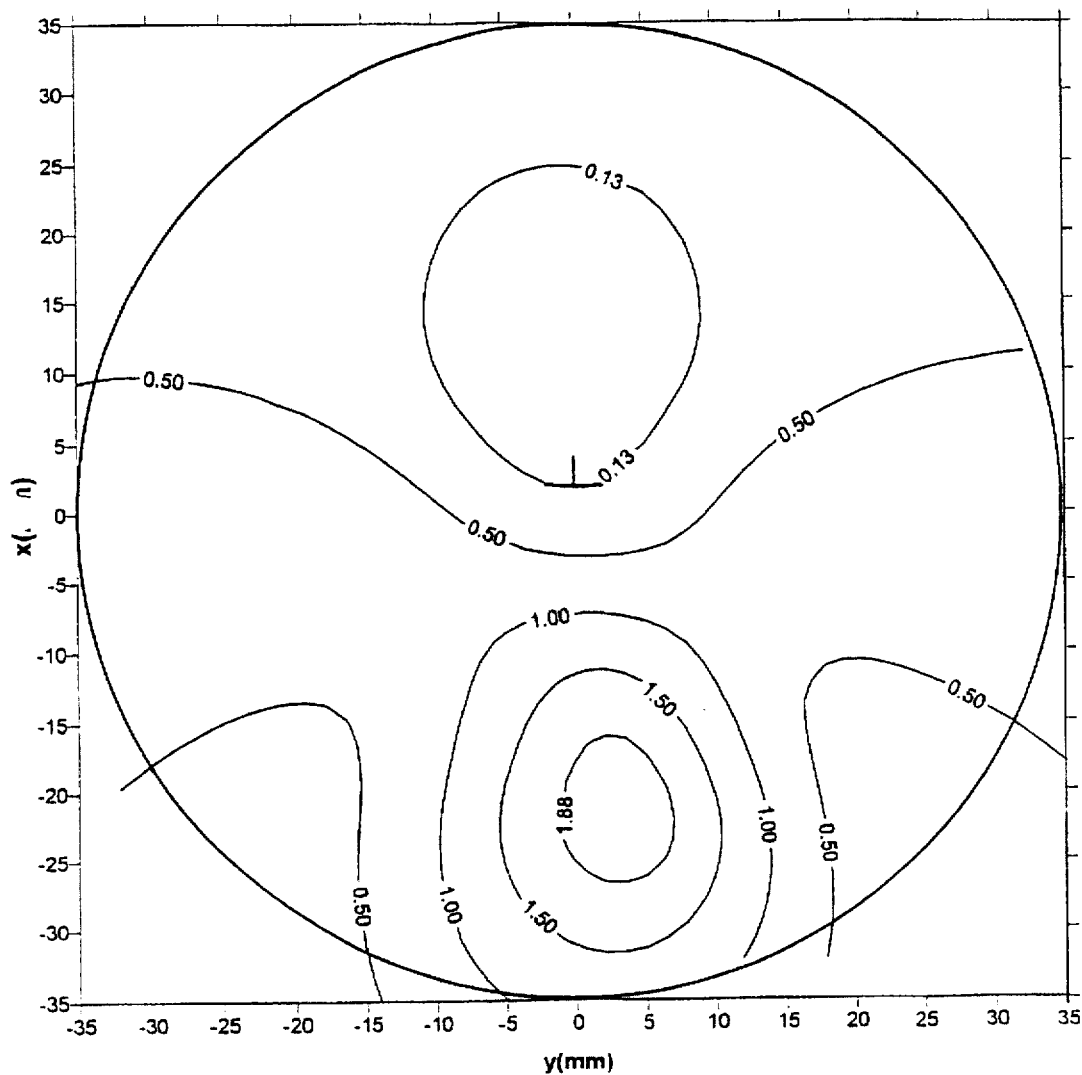

An embodiment of the composite design having an overall addition value of 2.00 D will now be described. For purposes of comparison, the surface astigmatism and mean power of a pure hard design of addition 2.00 D is shown in FIGS. 1 and 2; the pure hard design is characterized by a spherical DP and is to be considered prior art. The composite design will be composed of a linear superposition of (a) a soft component of addition 1.25 D, whose astigmatism and mean power characteristics are depicted in FIGS. 3 and 4; and (b) a pure hard component of addition 0.75 D, whose astigmatism and mean power characteristics are shown in FIGS. 5 and 6. Note that the hard component has a spherical DP and is in fact an 0.75 D add version of the lens depicted in FIGS. 1 and 2. The astigmatism and mean power characteristics of the composite design are shown in FIGS. 7 and 8. A comparison of FIGS. 7 and 1 shows that the contours of 0.50 D astigmatism of the composite and the pure hard designs are nearly coincident. This means that the utility of the DP and KP of the composite design matches that of the pure hard design. However, as indicated in Table 1, the maximum surface astigmatism of the pure hard design is 2.93 D, whereas the maximum surface astigmatism of the composite design is only 1.89 D, an astigmatism reduction of 35.5%. Notice, too, that the astigmatism and mean power gradients of the composite design are more gradual than those of the pure hard design, thus making the composite design the more comfortable design and the easier one to adapt to. This leads to the conclusion that the composite design principle achieves the stated objective of reducing aberration over that of the prior art spherical DP design while retaining the latter's DP and KP utility.

EXAMPLE 2

Figure 9:
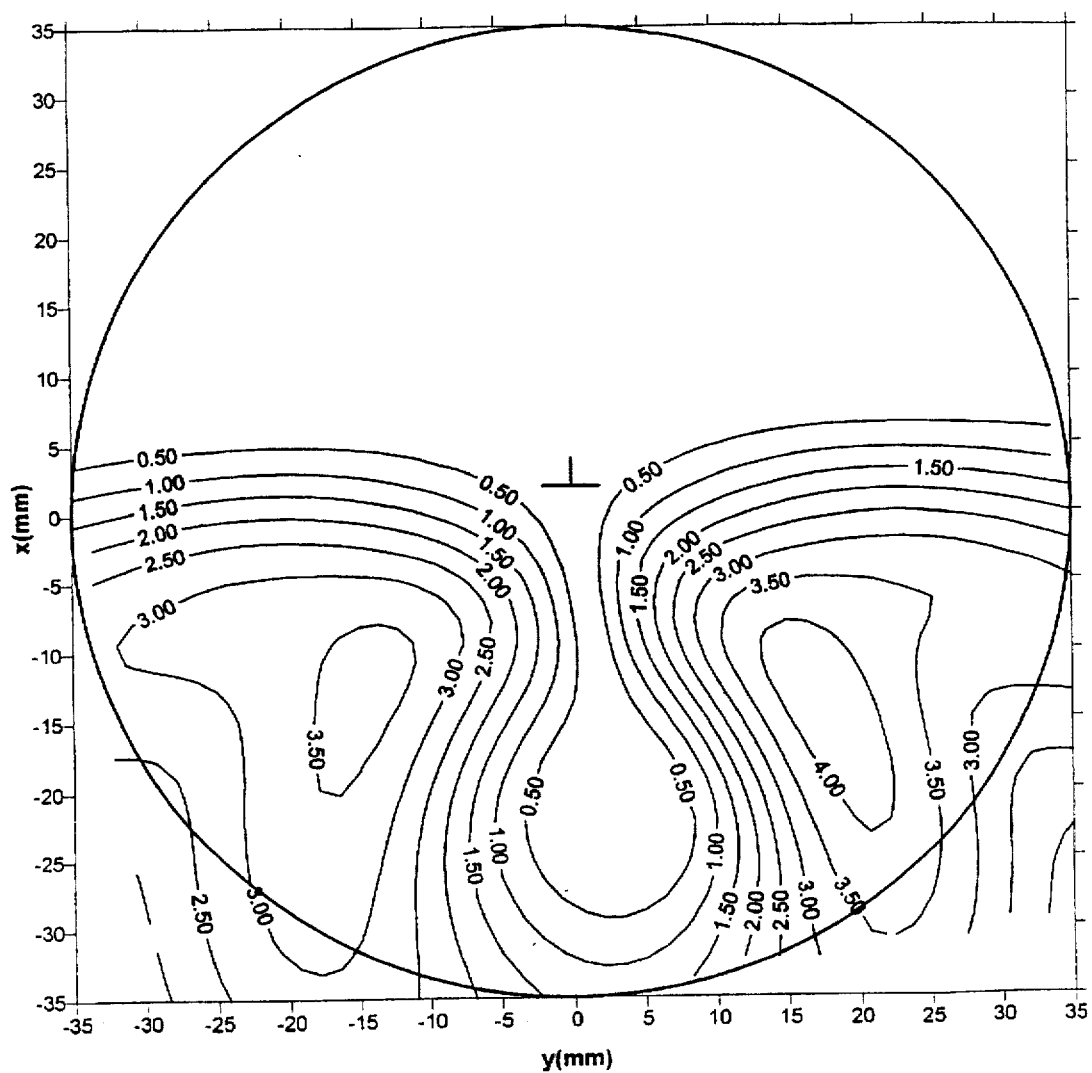
FIGS. 9 and 10 show, respectively, the theoretical surface astigmatism and power plots for a prior art hard lens design having a 3.0 D add.
Figure 10:
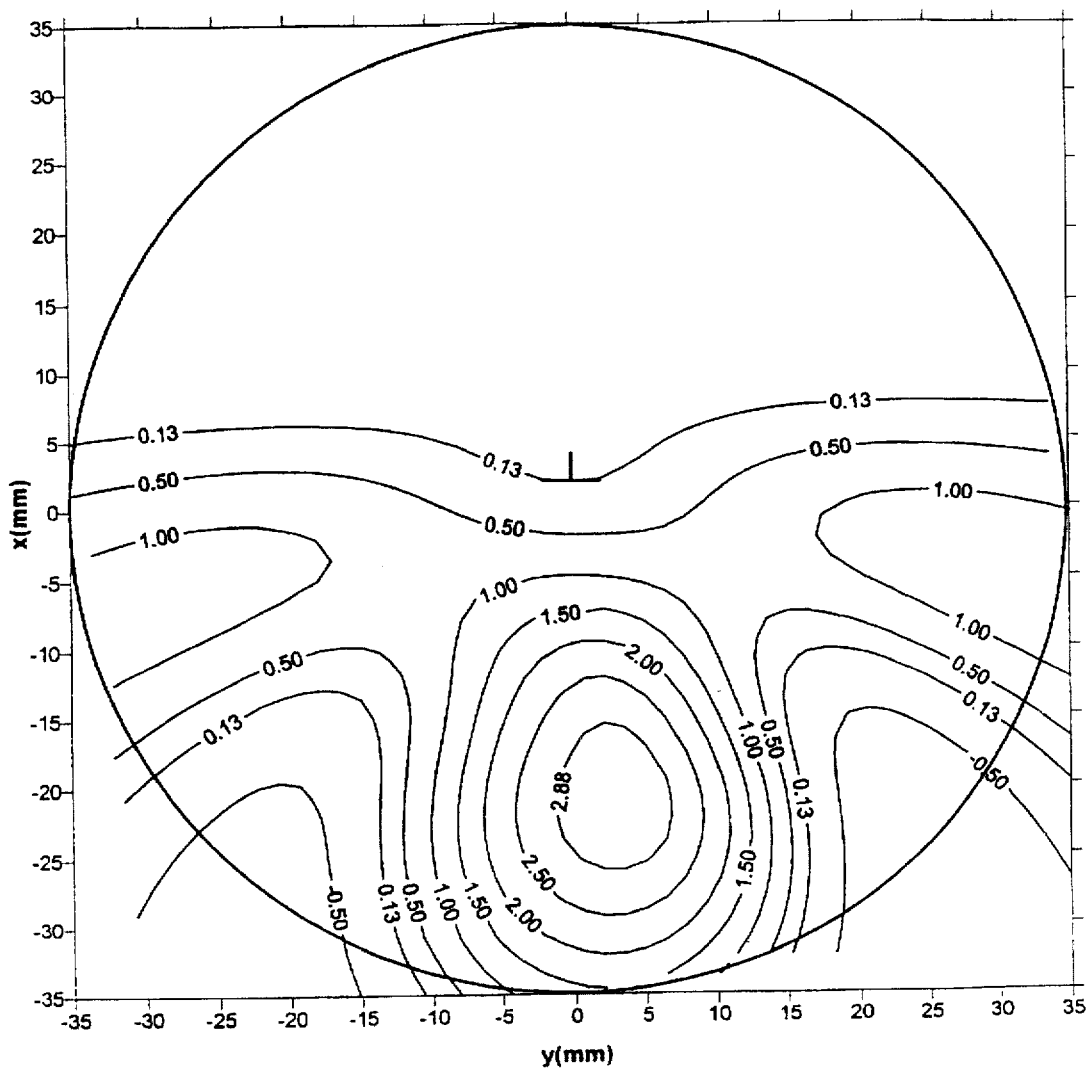
Figure 11:
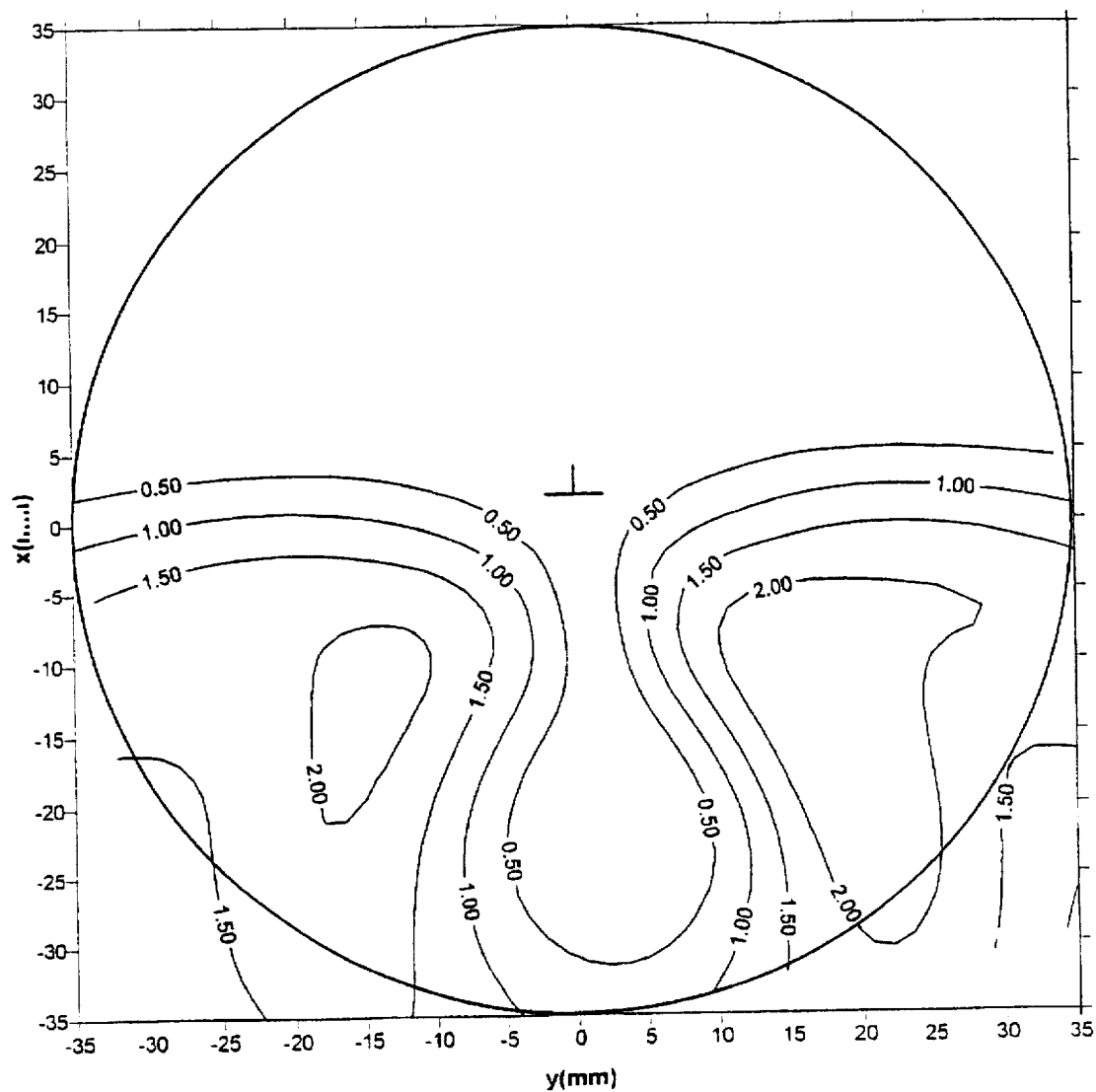
FIGS. 11 and 12 show, respectively, surface astigmatism and power plots for a prior art hard lens design having a 1.75 D add.
Figure 12:
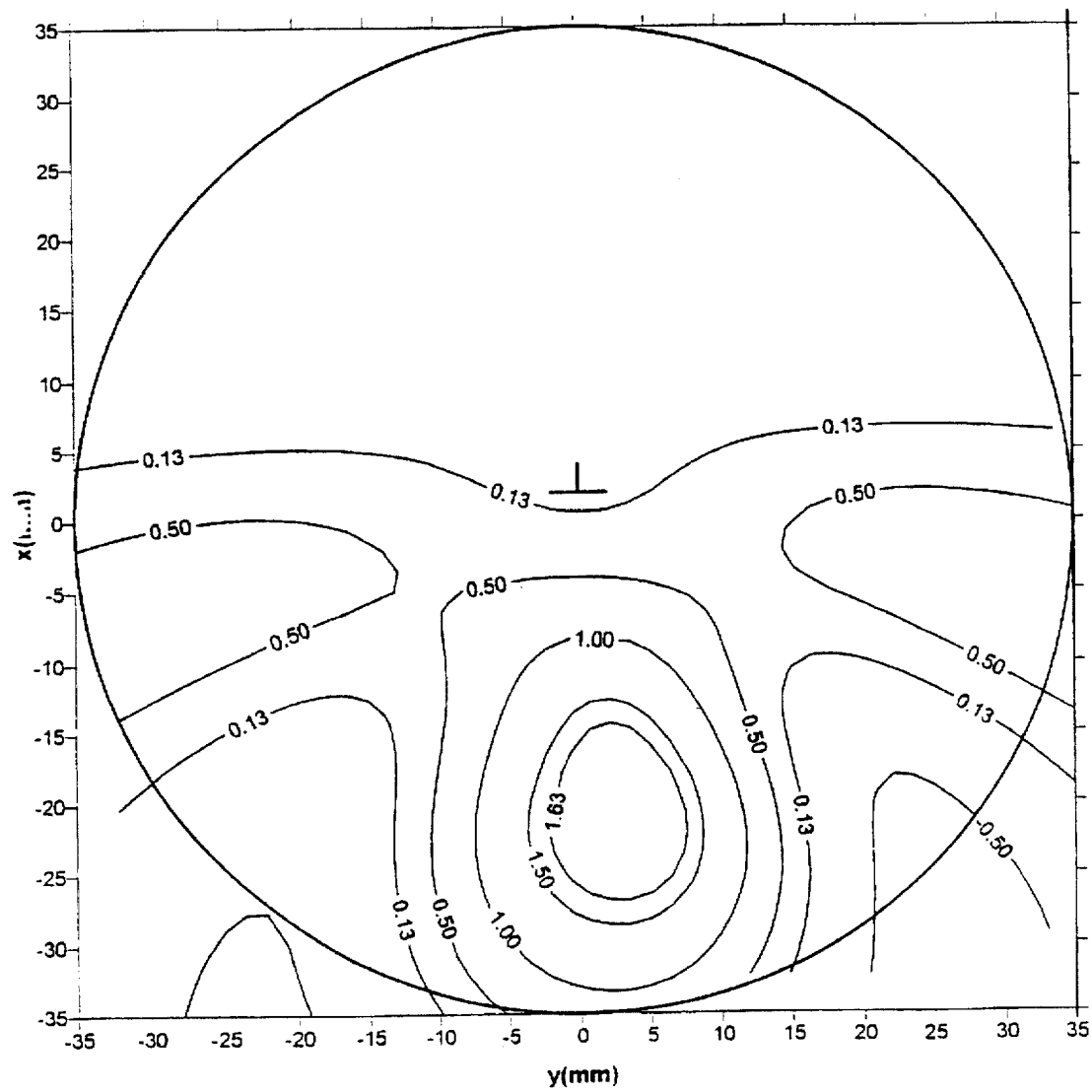
Figure 13:
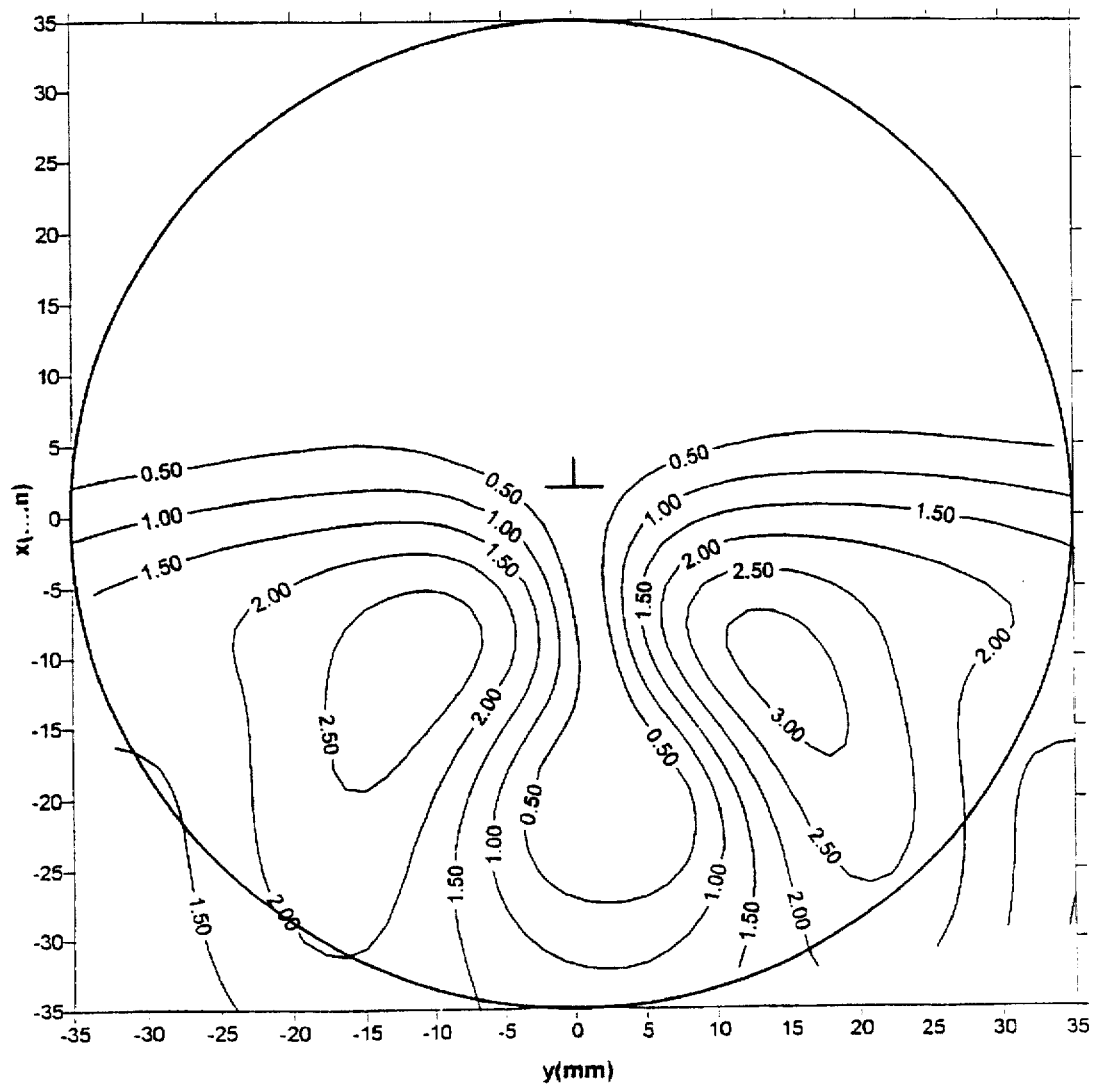
FIGS. 13 and 14 show, respectively, the theoretical surface astigmatism and power plots for a composite lens of this invention having a 3.0 D add.
Figure 14:
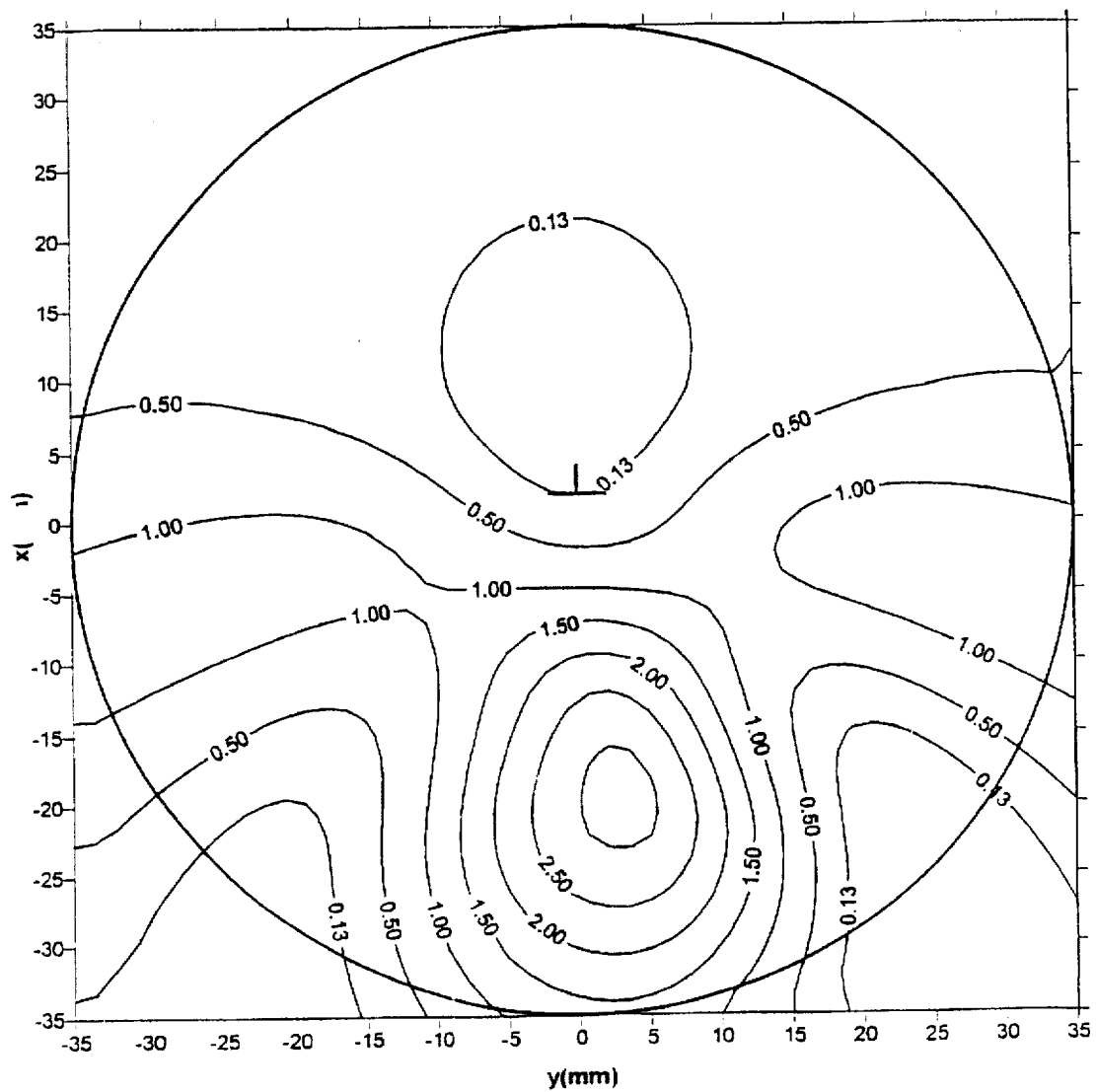

A second example of the invention will now be given for a composite lens having an overall addition of 3.00 D. The astigmatism and mean power characteristics of a pure hard design lens of 3.00 D addition are shown in FIGS. 9 and 10. The composite design will be composed of (a) the same soft component of addition 1.25 D as was used in the previous example and whose astigmatism and mean power characteristics are depicted in FIGS. 3 and 4; and (b) a pure hard component of addition 1.75 D, see FIGS. 11 and 12. The astigmatism and mean power characteristics of the composite lens are shown in FIGS. 13 and 14. A comparison of FIGS. 13 and 9 shows that the contours of 0.50 D astigmatism are nearly coincident, meaning that, as in the case of the previous example, the DP and RP utility of the composite design compares favorably with that of the pure hard design. Moreover, as indicated in Table 1, the maximum astigmatism of the pure hard design is 4.42 D, whereas that of the composite design is only 3.22 D, an astigmatism reduction of 27.1%. As in the case of the previous example, the reduced astigmatism and power gradients of the composite design make it the more comfortable one and the easier one to adapt to.

Table 1, below, sets forth a summary of the astigmatism characteristics of the lenses of Examples 1 and 2.

| Example | Addition A of soft component | Addition B of soft component | Maximum astigmatism of composite design | Maximum/ astigmatism of hard lens of Addition A | Reduction of astigmatism relative to hard design of Addition A | % reduction |
|---|---|---|---|---|---|---|
| 1 | 2.00 | 1.25 | 1.89 | 2.93 | 1.04 | 35.5 |
| 2 | 3.00 | 1.25 | 3.22 | 4.42 | 1.20 | 27.1 |

An approximate formula can be stated for the maximum astigmatism achieved in a composite design having a soft component of addition B. The maximum astigmatism contributed by the soft component alone is approximately 0.75 B, whereas that contributed by the hard component is approximately 1.5 (A—B). Hence the total maximum astigmatism of the composite design is $$astig(max) = 1.5\ A - 0.75\ B \tag{5}$$

and the reduction of astigmatism relative to that of a hard design of addition A is thus 0.75 B. Equation (5) assumes that the astigmatism maxima associated with the hard and soft components alone occur at the same point of the composite progressive surface. It is easily seen that the astigmatism values of Table 1 conform approximately to Equation (5).

Note that if the soft component of a composite design series is the same for all additions of the series, then the ratio of the maximum astigmatism to the addition varies with the addition. In current parlance the superposition design principle yields a multi-design lens series.

EXAMPLE 3

An actual composite lens according to this invention was constructed having an overall addition value of 2.00 D. This composite lens is composed of a linear superposition of (a) a soft component of addition 0.80 D and (b) a hard component of addition 1.2 D.

Figure 15:
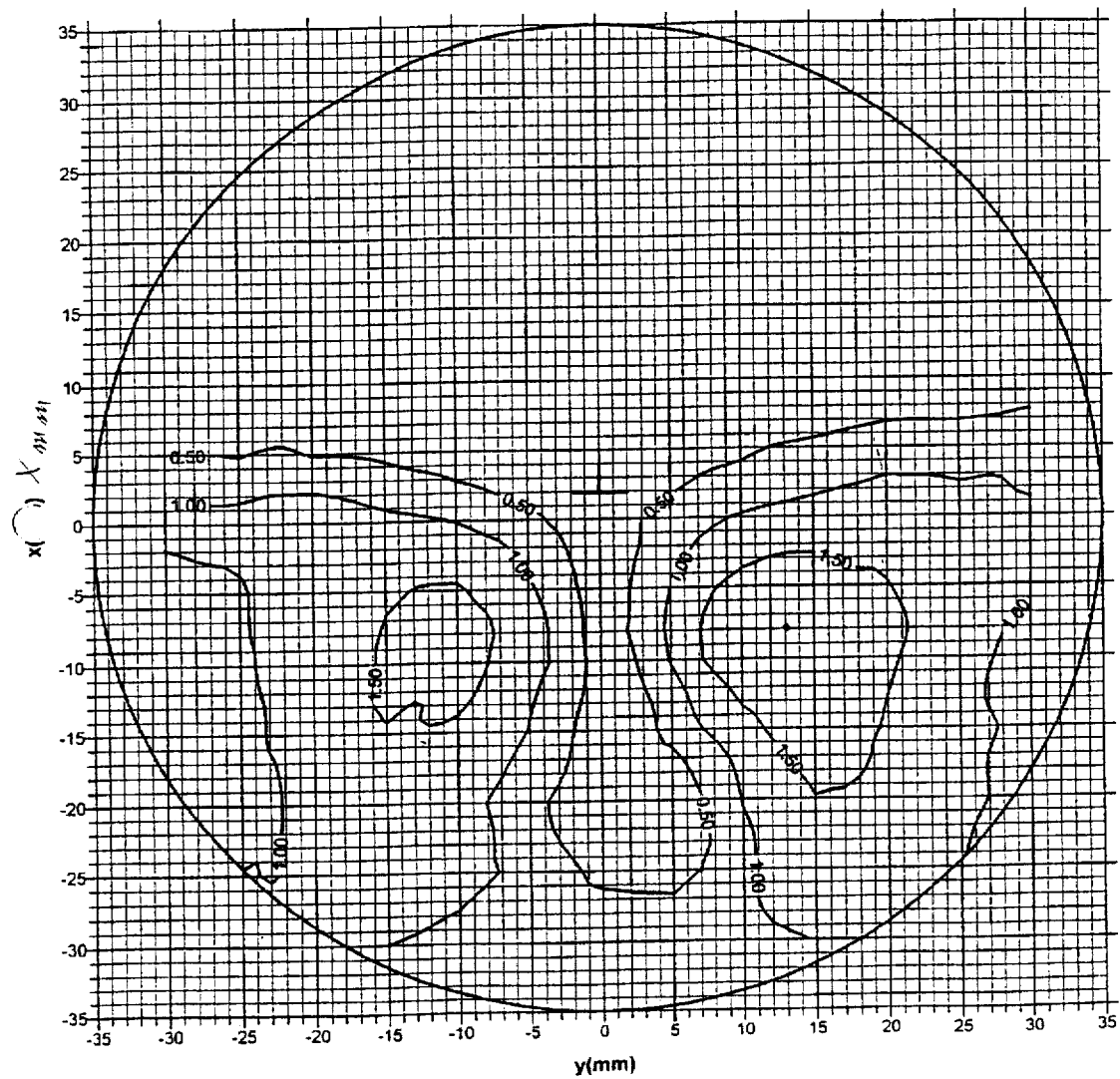
FIGS. 15 and 16 show, respectively, the surface astigmatism and power plots for an actual lens of this invention having a 2.0 D add.
Figure 16:
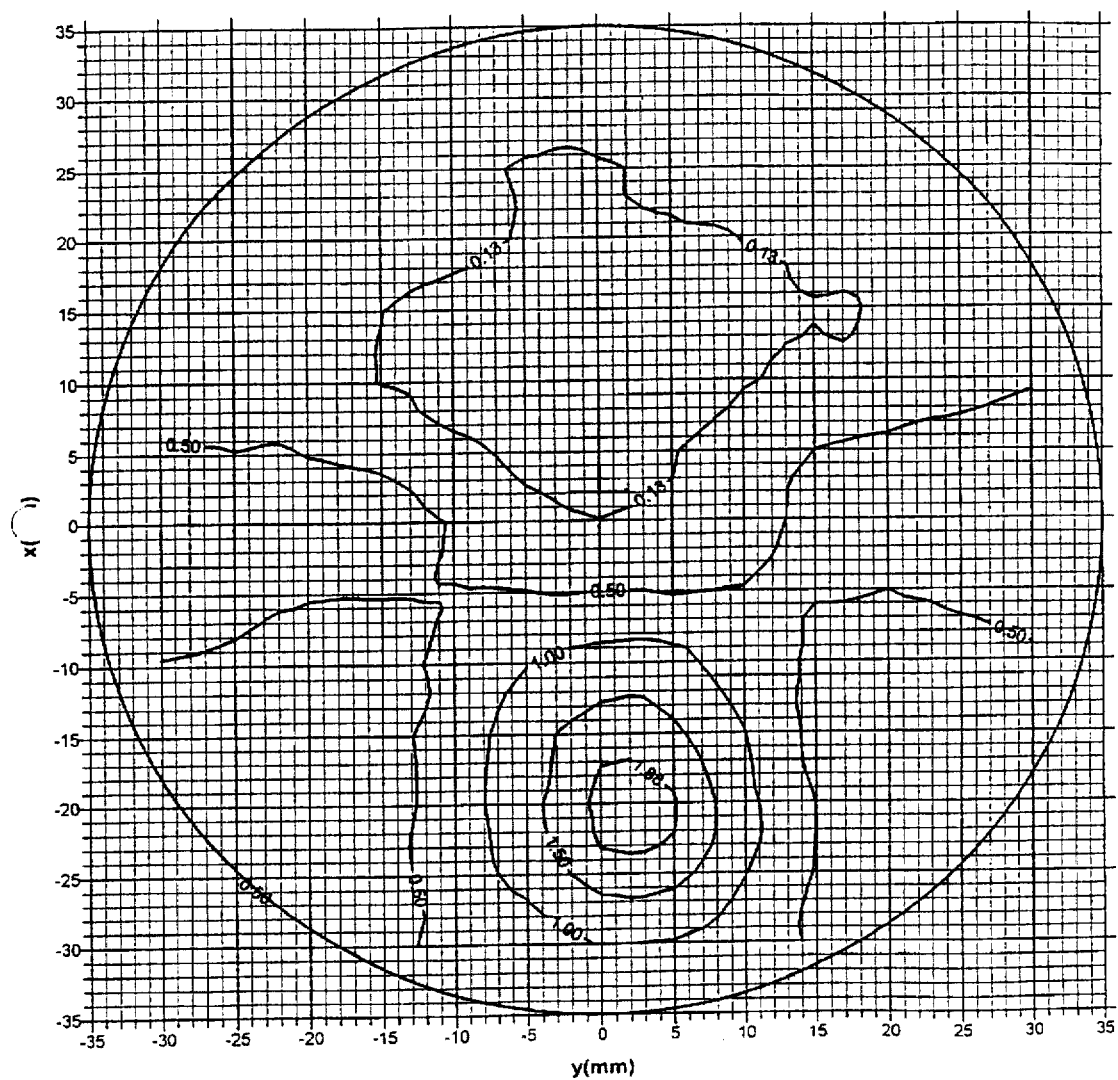

FIGS. 15 and 16 show the astigmatism and power plots of the actual lens of Example 3. Pertinent data derived from these plots are:

Distance portion width at level of MRP between branches of 0.50 mean power curve: 25.6 mm Distance portion width at level of MRP between 0.50 and 1.00 astigmatism curves, respectively: 12.6 mm and 36.0 mm, respectively.

Intermediate portion width at level 7 mm below MKP between 0.50 and 1.00 astigmatism curves, respectively: 3.7 mm and 9.3 mm, respectively.

Reading portion width at level 22 mm below MRP between 0.50 and 1.00 astigmatism curves, respectively: 11.07 mm and 18.0 mm, respectively.

Corridor length from MRP to 1.87 D power line: 19.0 mm

Maximum nasal astigmatism: 1.90 D

Gradient of astigmatism by 6 point method and 12 point method, respectively: 0.17 D/mm and 0.14 D/mm, respectively.

The astigmatism plot shows very little astigmatism above the 0–180 degree line, a characteristic normally found only in the hard progressive designs. On the other hand, the maximum surface astigmatism is less than 2.00 D and the gradient of astigmatism is less than 0.20 D/mm, values characteristic of soft progressives. Thus the superposition design of this invention can be said to provide the utility of a hard progressive and the comfort of a soft design while minimizing the disadvantages of the pure hard and soft designs.

Of course the lens of Example 3 is asymmetrical with respect to the corridor meridian to ensure binocular compatibility of the lens pair, as should be the case with any lens of this invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A progressive ophthalmic lens having:

a distance portion, a reading portion and an intermediate portion;

the lens having a composite progressive power surface $Z_C$ defined by the equation:

$$Z_C^{(A)} = Z_H^{(A-B)} + Z_X^{(B)} - Z_H^{(0)}$$

where:

$Z_C$=elevation of the progressive power surface above a reference plane;

$Z_H$=elevation of the progressive power surface above said reference plane for a first design component of the lens;

$Z_S$=elevation of the progressive power surface above said reference plane for a second design component of the lens;

A=the power addition of the composite lens; and

B=the power addition of said second design component.

2. The progressive ophthalmic lens of claim 1 wherein:

the power addition B is not more than 1.25 diopters.

3. The progressive ophthalmic lens of claim 1 wherein:

said first design component is a hard design component, and said second design component is a soft design component.

4. The method of defining a composite progressive power surface of a progressive ophthalmic lens having a distance portion, a reading portion, and an intermediate portion, including the steps of:

defining a first design component of addition A—B, defining a second design component of addition B, and defining a composite progressive power surface $Z_C$ according to the equation:

$$Z_C^{(A)} = Z_H^{(A-B)} + Z_S^{(B)} - Z_H^{(0)}$$

where:

$Z_C$=elevation of the progressive power surface above a reference plane;

$Z_H$=elevation of the progressive power surface above said reference plane for a first design component of the lens;

$Z_S$=elevation of the progressive power surface above said reference plane for a second design component of the lens;

A=the power addition of the composite lens; and

B=the power addition of said second design component.

5. The method of claim 4 wherein:

the power addition B is not more than 1.25 diopters.

6. The method of claim 4 wherein:

said first design component is a hard design component, and said second design component is a soft design component.

* * * * *

UNITED STATES PATENT AND TRADEMARK OFFICE
CERTIFICATE OF CORRECTION

PATENT NO. : 5,726,734
DATED : Mar. 10, 1998
INVENTOR(S) : John T. Winthrop

It is certified that error appears in the above-identified patent and that said Letters Patent is hereby corrected as shown below:

Column 2, line 1, delete "$Z_N(A)$" in formula (2) and insert therefor --$Z_H(A)$--

Column 2, line 5, delete "$Z_X(A)$" in formula (3) and insert therefor --$Z_S(A)$--

Column 2, lines 21, 24, 27, 30, 33 and 36, delete the period "." and insert therefor a semi-colon --;-- in six places Column 2, line 40, delete the period "." and insert therefor a "semi-colon" and "and" --; and--

Column 2, line 60, delete "$Z_X(B)$" in formula (4) and insert therefor --$Z_S(B)$--

Column 3, line 49, delete "KP" and insert therefor --RP--

Column 3, line 61, delete "KP" and insert therefor --RP--

Column 5, line 6, delete "MKP" and insert therefor --MRP--

Column 5, line 46, delete "$Z_X(B)$" and insert therefor --$Z_S(B)$--

Signed and Sealed this

Eleventh Day of July, 2000

Q. TODD DICKINSON

*Attest:*

*Attesting Officer*  *Director of Patents and Trademarks*